United States Patent Office 3,565,695
Patented Feb. 23, 1971

3,565,695
METHOD OF FORMING AN AMALGAMATED ZINC ELECTRODE
Elihu C. Jerabek, Voorheesville, N.Y., assignor to General Electric Company, a corporation of New York
No Drawing. Filed Apr. 1, 1968, Ser. No. 717,894
Int. Cl. H01m 13/08, 43/02
U.S. Cl. 136—126                                         2 Claims

ABSTRACT OF THE DISCLOSURE

A zinc electrode comprises a support, zinc powder pressed against the opposite surfaces of the support, and zinc powder amalgamated with mercury in the surface of the electrode. Additionally, a zinc electrode comprises a support, zinc powder amalgamated with a small weight percent of mercury pressed against the opposite surfaces of the support, and zinc powder in the surface of the electrode amalgamated to a higher level than the first amalgamation. A method of forming a zinc electrode comprises contacting the pressed electrode with an aqueous solution of a mercury salt thereby amalgamating the zinc powder in the surface of the electrode, and removing the remaining zinc salt residue.

---

This invention relates to zinc electrodes and to methods of forming such electrodes and, more particularly, to such electrodes with zinc powder amalgamated with mercury in the electrode surface and to methods of forming such electrodes.

Zinc electrodes are useful as anodes in a variety of secondary cells and batteries. Such cells and batteries employ generally an alkaline electrolyte such as potassium hydroxide or sodium hydroxide. A suitable cathode is a depolarizing electrode which is active in an alkaline electrolyte.

Presently, serious problems in cells which employ a zinc anode electrode and a cathode electrode are the sloughing of surface particles from the pressed zinc electrode, and loss of capacity of the zinc electrode when left on open circuit.

I found that the above problems are overcome by amalgamating with mercury the zinc powder in the surface of such a zinc electrode after it had been pressed. I found further than I could contact a pressed zinc electrode with an aqueous solution of mercury salt thereby amalgamating the zinc powder in its surface, after which the remaining salt residue is removed producing an improved zinc electrode. Such improvement is shown by the more sturdy electrode with a surface which is not subject to sloughing of the particles therefrom when handled or used in a cell or battery.

I found further that such amalgamation of the zinc powder in the electrode surface, to be effective and to result in an improved electrode, should be done after the zinc electrode has been pressed. When the pressed electrode is contacted by a mercury salt, the zinc powder in its surface is amalgamated by the mercury. The zinc particles in the electrode surface extract the mercury rapidly thereby allowing only a very small amount of amalgamation of the interior zinc particles by the mercury from the solution.

It is a primary object of my invention to provide a zinc electrode which is not subject to sloughing of surface particles and which produces a lower self-discharge rate when employed as an anode in a cell or battery.

It is another object of my invention to provide an improved method of forming such an electrode.

In accordance with my invention, a method of forming a zinc electrode comprises providing zinc powder, providing a support, applying the zinc powder to opposite surfaces of hte support, pressing the zinc powder against the support thereby forming a zinc electrode, contacting the zinc electrode with an aqueous solution of a mercury salt thereby amalgamating the zinc powder in the surface of the electrode, and removing the remaining zinc salt residue thereby providing an improved zinc electrode.

These and various other objects, features and advantages of the invention will be better understood from the following description.

A pressed zinc electrode is prepared by providing zinc powder which has not been amalgamated by mercury or by mixing zinc powder in a mercury salt electrolyte such that the zinc powder becomes amalgamated to 5 to 20 weight percent mercury. A support is used onto which the above powder mixture is applied and pressed. Such a support is usually in the form of a metallic screen, and it preferably is a silver screen. An electrical lead is attached to the support to provide such a lead for the electrode which is formed.

A die is filled with the above powder mixture after which the screen support with its lead is positioned in the center of the powder. In this manner, the powder mixture is applied to opposite surfaces of the support. The powder mixture is pressed against the support at a pressure of generally about 5,000 pounds per square inch to thereby form a zinc electrode structure.

The above type of zinc electrode is usually employed in a primary cell or battery which has a cathode electrode, such as silver oxide, and an alkaline electrolyte, such as potassium hydroxide or sodium hydroxide. Such an electrode is subject to the problem of sloughing of the surface particles when handled, or assembled, or used in a cell. Additionally, this electrode is subjected to a loss of capacity when left on open circuit because of reaction with the caustic electrolyte.

The above pressed electrode is then processed in accordance with the method of my invention to provide an improved zinc electrode. First, the pressed electrode is contacted by an aqueous solution of a mercury salt. While various mercury salts can be employed in my method, I found that the preferred mercury salts are mercuric chloride and mercuric acetate. Various concentrations of the mercury salt in the aqueous solution are suitable in the method of the present invention. When the zinc electrode is contacted by the mercury salt, such as by immersion therein, the zinc powder in the surface of the electrode is amalgamated by the mercury. This amalgamation provides a zinc electrode which is not subject to sloughing of the surface particles.

The amalgamation of the zinc powder in the surface of the electrode can be decreased or increased by decreasing or increasing the conconcentration of the mercury salt in the solution. Similarly, this amalgamation can be decreased or increased by respective decreasing or increasing of the time of contact with the mercury salt, providing there is sufficient mercury ion still in the solution. While amalgamation of the zinc powder in the surface of the electrode provides a unique electrode, such amalgamation can be provided by various weight percents of the mercury in the zinc powder. The maximum amount of amalgamation which can be utilized in the present invention to provide the improved electrode structure is an amalgamation of the zinc powder in the surface of the electrode which still provides some surface voids.

In the practice of the present invention, I prefer to employ an aqueous solution of mercuric chloride or mercuric acetate, which is used in a 0.1 molar concentration. I found that contacting the pressed zinc electrode with the above solution, for example by immersing the electrode therein for only several seconds, was sufficient to provide sufficient amalgamation of the zinc powder in the surface of the electrode to prevent sloughing of of the zinc particles from the surface of the electrode and to produce a lower self-discharge rate when the electrode was subsequently tested.

After the pressed electrode has been contacted by a mercury salt to amalgamate the zinc powder in the surface of the electrode, the electrode is washed to remove the salt residue from the electrode. For example, I found that such an electrode when washed in flowing distilled water for about 2 minutes, had all the chloride residue removed therefrom.

Examples of pressed zinc electrodes and methods of forming such electrodes in accordance with my invention are set forth below:

EXAMPLES 1–3

Three pressed zinc electrodes were prepared. Each of the pressed zinc electrodes was prepared by mixing zinc powder in a mercury salt electrolyte of mercuric chloride so that the zinc powder became amalgamated to 5 weight percent mercury. A support in the form of a silver screen was used onto which the above amalgamated powder was applied and pressed. A die was filled with the above powder after which the screen support with an electrical lead extending therefrom was positioned in the center of the powder. In this manner, the powder mixture was applied to opposite surfaces of the support. The powder was pressed against the support at a pressure of 5,000 pounds per square inch to thereby form a zinc electrode. The above three pressed zinc electrodes are referred to as Examples 1, 2 and 3. The electrode of Example 1 was not formed further into an improved electrode of applicant's invention. The electrodes of Examples 2 and 3 were formed further into improved electrodes of applicant's invention. Electrodes 2 and 3 were immersed in 500 milliliters of an aqueous solution of 0.1 M mercuric chloride for periods of 2 seconds and 10 seconds, respectively. Each of the electrodes 2 and 3 was washed subsequently in flowing distilled water for two minutes to remove all the chloride residue. Neither electrode 2 or 3 sloughed any zinc particles upon handling. Electrode 3 was darker in color than electrode 2.

The three electrodes were tested for self-discharge by positioning each electrode in a separate container with an aqueous solution of potassium hydroxide as the electrolyte. The self-discharge rate was determined by measuring the amount of hydrogen gas generated by the attack of the electrolyte upon the electrode. Table I sets forth below the hours tested, total hydrogen gas generation in cubic centimeters, and the hydrogen gas generated in cubic centimeters per hour.

TABLE I

| Example No.: | Hours tested | Total $H_2$ gas generated, cc. | $H_2$ gas generated, cc./hour |
|---|---|---|---|
| 1 | 865 | 0.86 | 0.00099 |
| 2 | 865 | 0.71 | 0.00082 |
| 3 | 865 | 0.57 | 0.00066 |

It is seen from the above Table I that electrodes 2 and 3 formed in accordance with the present invention have a substantially reduced self-discharge rate.

While other modifications of the invention and variations thereof which may be employed within the scope of the invention have not been described, the invention is intended to include such as may be embraced within the following claims.

What we claim as new and desired to secure by Letters Patent of the United States is:

1. A method of forming an amalgamated zinc electrode which comprises providing zinc powder, amalgamating the zinc powder, providing a support, applying the amalgamated zinc powder to the support, pressing the amalgamated zinc powder against the support thereby forming a pressed zinc structure, contacting the pressed zinc structure with an aqueous solution of a mercury salt at a concentration for a sufficient time to further amalgamate the zinc powder substantially only in the surface of the structure, and removing the remaining salt residue thereby providing an amalgamated zinc electrode being amalgamated to a higher level on its surface.

2. In a method as in claim 1, wherein the mercury salt is mercuric chloride.

References Cited

UNITED STATES PATENTS

| 618,993 | 2/1899 | Paget | 136—128X |
| 401,291 | 4/1889 | Main | 136—30 |
| 680,848 | 8/1901 | Erny | 136—126 |
| 1,364,953 | 1/1921 | Pouchain | 136—126 |
| 3,069,486 | 12/1962 | Solomon et al. | 136—125 |
| 3,071,638 | 1/1963 | Clark et al. | 136—126X |

WINSTON A. DOUGLAS, Primary Examiner

M. J. ANDREWS, Assistant Examiner

U.S. Cl. X.R.

136—31